US 7,850,078 B2

(12) United States Patent
Christenson et al.

(10) Patent No.: US 7,850,078 B2
(45) Date of Patent: Dec. 14, 2010

(54) REMOTE CONTROL REACTIVATION

(75) Inventors: Keith A. Christenson, Canton, MI (US);
David Gutknecht, Rochester, MI (US);
Bryan Vartanian, Livonia, MI (US)

(73) Assignee: Lear Corporation, Southfield, MI (US)

( * ) Notice: Subject to any disclaimer, the term of this patent is extended or adjusted under 35 U.S.C. 154(b) by 904 days.

(21) Appl. No.: 11/738,872

(22) Filed: Apr. 23, 2007

(65) Prior Publication Data

US 2008/0258553 A1 Oct. 23, 2008

(51) Int. Cl.
*G06K 5/00* (2006.01)
*G07B 15/02* (2006.01)
*H04B 1/38* (2006.01)

(52) U.S. Cl. ................... 235/382; 235/384; 340/5.61

(58) Field of Classification Search .............. 235/382, 235/384; 340/5.61, 462.36, 5.72, 825.49
See application file for complete search history.

(56) References Cited

U.S. PATENT DOCUMENTS

| 4,670,746 | A | * | 6/1987 | Taniguchi et al. | ......... 340/5.62 |
|---|---|---|---|---|---|
| 5,499,022 | A | * | 3/1996 | Boschini | ................... 340/5.62 |
| 5,602,426 | A | * | 2/1997 | Ecker | ..................... 307/10.2 |
| 6,906,612 | B2 | | 6/2005 | Ghabra et al. | |
| 7,042,342 | B2 | | 5/2006 | Luo et al. | |
| 7,046,119 | B2 | | 5/2006 | Ghabra et al. | |
| 7,167,084 | B2 | | 1/2007 | Proefke et al. | |
| 2004/0054934 | A1 | * | 3/2004 | Emmerling et al. | ......... 713/202 |
| 2006/0255908 | A1 | * | 11/2006 | Gilbert et al. | .............. 340/5.61 |

FOREIGN PATENT DOCUMENTS

JP            2006118156 A       5/2006

* cited by examiner

*Primary Examiner*—Seung H Lee
*Assistant Examiner*—Sonji Johnson
(74) *Attorney, Agent, or Firm*—Brooks Kushman P.C.

(57) ABSTRACT

A remote control system includes a portable control unit with a user interface. A radio frequency transceiver communicates with the remote control system to determine if the portable unit is within a secure space. Commands from the remote control system are ignored when the portable control unit is within the secure space until a predetermined code is entered on the user interface.

12 Claims, 3 Drawing Sheets

REMOTE CONTROL REACTIVATION

BACKGROUND OF THE INVENTION

1. Field of the Invention

The present invention relates to activating or authorizing remote controls for gaining entry to a secure location, activating functionality, or the like.

2. Background Art

Remote controls provide convenience to users. However, if a remote control falls into the wrong hands, access to a secure location or activation of certain functionality may be obtained by an unauthorized user.

An example of such a remote control is a passive entry keyfob for automotive vehicles. This device allows entry into a vehicle when brought into close proximity. Additional functionality may include active functions such as lock/unlock doors, raise/lower windows, start engine, and the like.

Typical passive entry systems utilize multiple antennas on the vehicle to detect whether the keyfob is outside or inside the vehicle. If the passive entry keyfob is left inside the vehicle when the vehicle is locked, the passive entry system deactivates the keyfob. This prevents the system from incorrectly detecting the keyfob as being outside the vehicle, which can happen, for example, from signal leakage. Such an incorrect detection can result in various unwanted actions such as unlocking the door if the door handle is pulled (and no authorized keyfob is near the outside of the car), allowing a child left in the vehicle to start the vehicle using the push button start function, or the like. Typically, the keyfob is reactivated if another keyfob is used in a particular manner or if a vehicle door is unlocked using a key or a different authorized keyfob.

Present techniques for reactivating the keyfob may create security issues. For example, if a thief breaks into the vehicle and finds the keyfob, the thief can gain use of the keyfob by simply using the RKE function. Thus, if the vehicle has push button start functionality, the thief can drive away with the vehicle. This security issue can be addressed by fully deactivating both the passive entry functionality and the RKE functions of the keyfob. However, this creates an additional problem if the vehicle owner needs to reactivate the keyfob and this is the only keyfob available.

SUMMARY OF THE INVENTION

The present invention provides for reactivating a remote control, such as a keyfob, by allowing the user to enter a code on the remote control. In an embodiment, the remote control is deactivated when it is left in a secure area such as, for example, the interior of a vehicle.

DETAILED DESCRIPTION OF THE PREFERRED EMBODIMENT(S)

Figure 1:
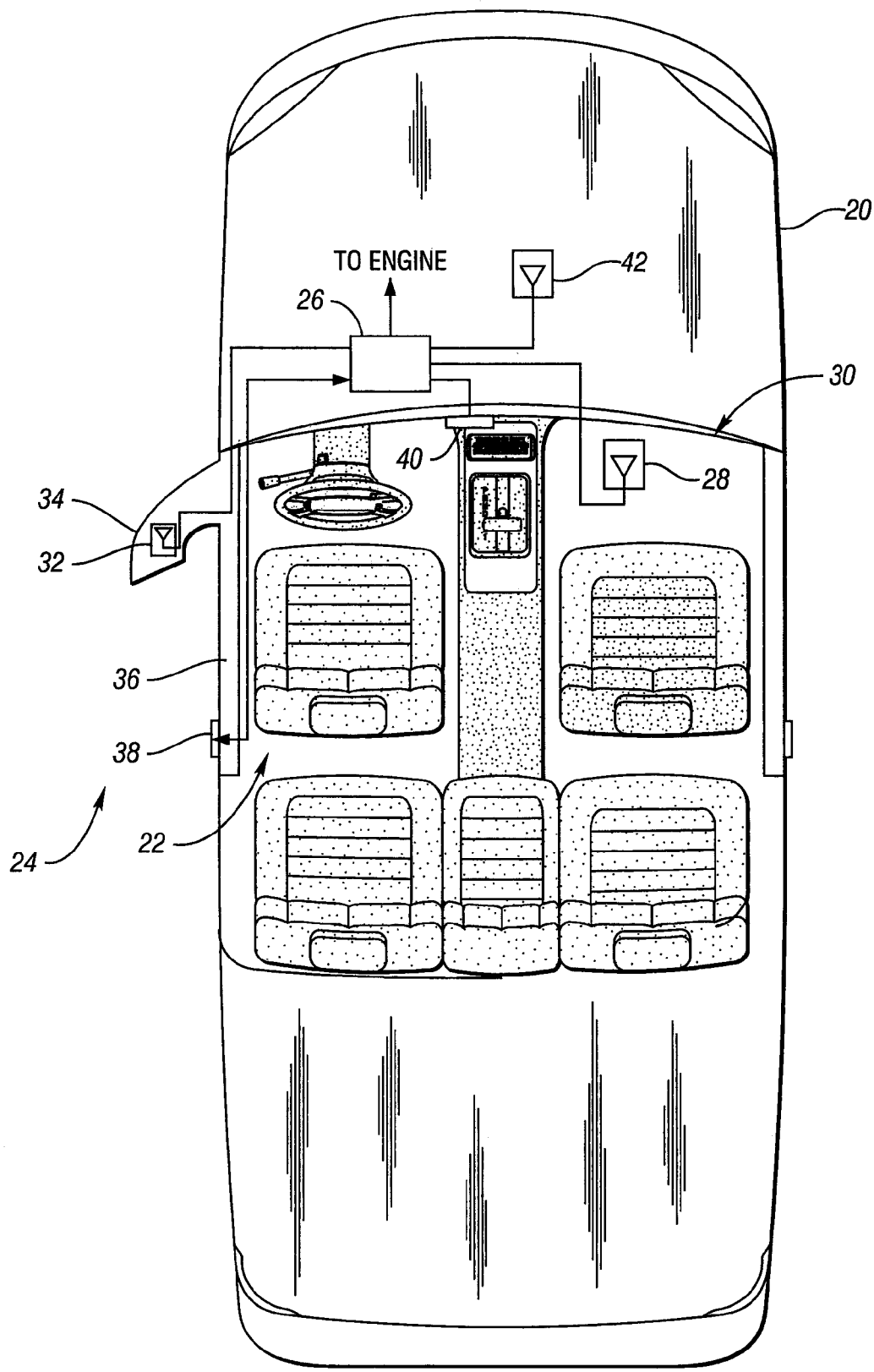
FIG. 1 is a block diagram illustrating an automotive vehicle according to an embodiment of the present invention.

Referring to FIG. 1, a block diagram illustrating an automotive vehicle according to an embodiment of the present invention is shown. Vehicle 20 has interior region 22 and exterior region 24. Passive entry electronic module 26 is coupled to interior low frequency antenna 28, which may be mounted to a vehicle instrument panel 30, for example. Module 26 is also coupled to exterior low frequency antenna 32, which may preferably be mounted in an exterior structure such as side view mirror housing 34, or in a door, such as door 36. One or more interior low frequency antenna 28 and exterior low frequency antenna 32 may be used to determine the location of one or more fobs relative to vehicle 20. In particular, antennas 28, 32 may be used to determine whether or not a particular keyfob is located in interior region 22 or exterior region 24. One or more known techniques may be used, alone or in combination, including triangulation, signal strength measurement, antenna directionality, and the like.

Vehicle door 36 may provide a portion of a border between interior region 22 and exterior region 24. Door handle 38 includes an activation switch and a lock actuator mechanism, which are both coupled to module 26. By lifting door handle 38, a user generates a door unlock request that causes module 26 to interrogate for an authorized fob, not shown for clarity. If an authorized keyfob is detected in exterior region 24, the door is unlocked. Start switch 40 may also be provided on instrument panel 30 and coupled to module 26 in order to generate a user request for starting or enabling the vehicle engine, motor, or the like.

Vehicle 20 also includes high frequency antenna 42 coupled to module 26. High frequency antenna 42 is operative to receive transmissions from one or more keyfobs, including user-initiated commands from the fob including lock, unlock, trunk release, engine start, panic alarm, window operation, climate control, anti-theft functionality, vehicle location, and the like. High frequency antenna 42 may also receive keyfob information related to location, identification, status, and the like. High frequency antenna 42 may also be used to transmit status information for display by the keyfob.

Figure 2:
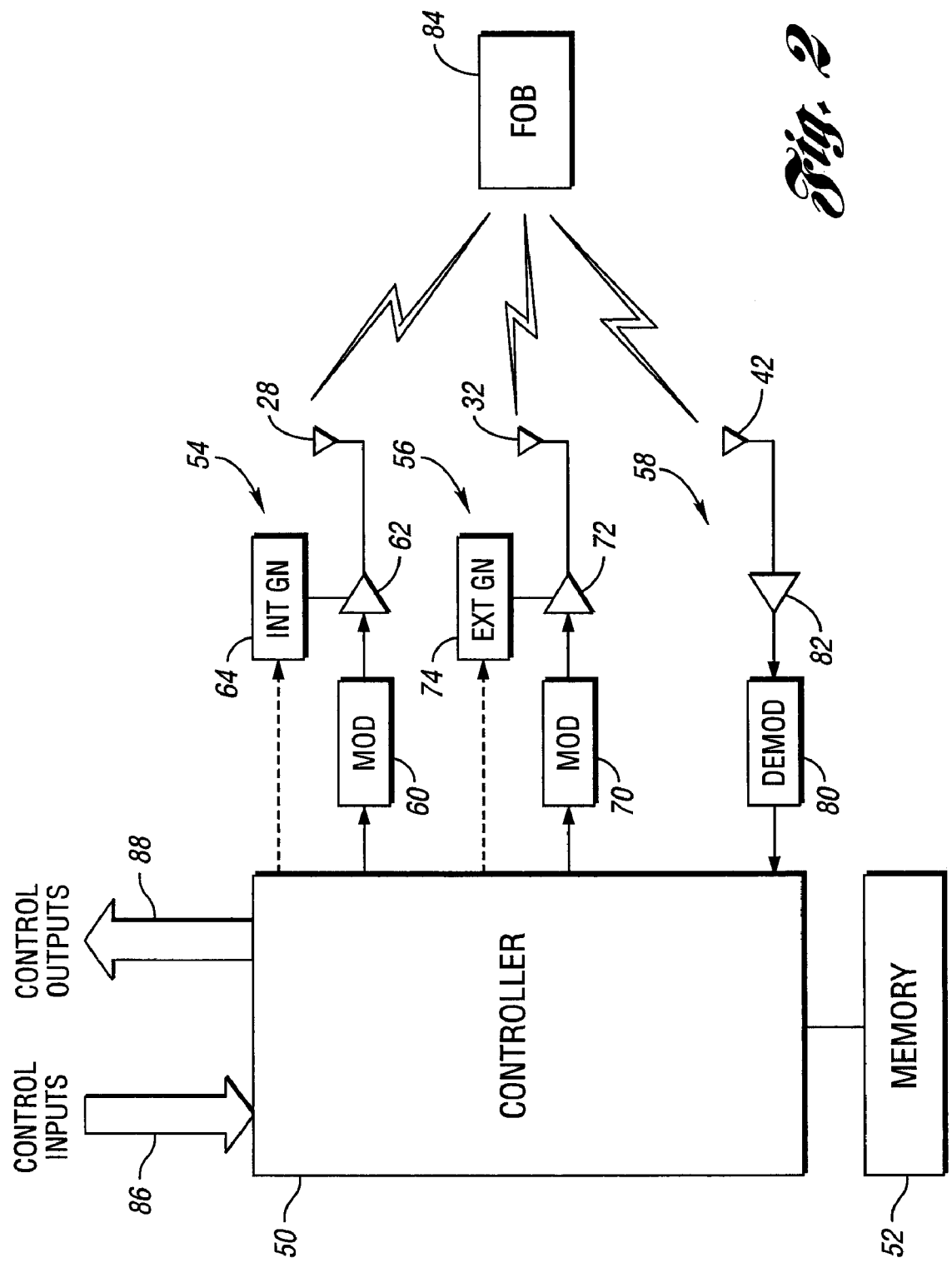
FIG. 2 is a block diagram illustrating a vehicle control system according to an embodiment of the present invention.

Referring now to FIG. 2, a block diagram illustrating a vehicle control system according to an embodiment of the present invention is shown. Module 26 may include controller 50 interfacing with memory 52. Controller 50 is preferably a microprocessor but may also include, or be replaced by, application specific integrated circuit(s), discrete logic, analog components, distributed processors, and the like. Memory 52 may store various information including executable code, calibration data, software variables, a list of authorized keyfob identifiers, the status of each authorized keyfob (e.g., activated, deactivated), and the like. Memory 52 may be composed of one or more different memory types, such as ROM, RAM, PROM, EPROM, EEPROM, flash, magnetic storage, optical storage, and the like. Some or all of memory 52 may be incorporated into processor 50 or may be separate from processor 50.

Interior transmitter 54 includes modulator 60 which modulates a low frequency carrier such as, for example, 125 kHz, with data generated by controller 50. Variable amplifier 62 amplifies the modulated signal with a gain specified by interior gain value 64 set by controller 50. The amplified modulated signal is transmitted from interior low frequency antenna 28. Exterior low frequency transmitter 56 functions similarly to interior transmitter 54. Modulator 70 modulates a low frequency carrier with data generated by controller 50. Variable amplifier 72 amplifies the modulated signal with a gain specified by exterior gain value 74 set by controller 50. The amplified modulated signal is transmitted from exterior low frequency antenna 32.

High frequency receiver 58 includes amplifier 82 amplifying high frequency signals received by antenna 42. These signals include data modulated by a carrier at a high frequency such as, for example, xxx MHz. Demodulator 80 demodulates the amplified received high frequency signal to produce data for controller 50. This data may include, for example, commands from keyfob 84, identification of keyfob 84, location information from keyfob 84, and the like. This data may also includes a sequence of user inputs from keyfob 84 to reactivate keyfob 84, as will be described in greater detail below.

In the configuration shown, module 26 includes an interior transmitter, shown generally by 54, an exterior transmitter, shown generally by 56, and a high frequency receiver, shown generally by 58. As will be recognized by one of ordinary skill in the art, the present invention does not depend on the configurations of transmitters and receivers in module 26. For example, a single frequency transceiver could be used. Alternatively, a single low frequency transmitter could be used with switching between internal and external antennas. Also a high frequency transceiver or separate receiver and transmitter may be used. In addition, while a single low frequency interior transmitter/antenna, a single exterior low frequency transmitter/antenna, and a single high frequency receiver/antenna are shown, multiple sets of any of these may be included. For example, the exterior low frequency transmitter may support a plurality of exterior low frequency antennas. Various combinations of one or more frequencies may be used. For example, different frequencies may be used for internal transmission and for external transmission. A single frequency may be used for both transmission and reception. Low frequency transceivers may be used for keyfob location and high frequency transceivers for RKE functionality. As an alternative, or in addition with, radio frequency media, various other media may be used including infrared, visible light, sound, and the like. The construction of various applicable transmitters, receivers, and transceivers is well known in the electronic arts.

Controller 50 receives control inputs 86 providing information on the state of vehicle 20 or input from an occupant of vehicle 20. With reference as well to FIG. 1, control inputs 86 may include the state of door handle 38, input from engine start switch 40. Other inputs can include the state of various doors, windows, alarm systems, vehicle monitoring systems, communication systems, positioning systems, and the like. Controller 50 generates control outputs 88 for controlling the functionality of vehicle 20. Control outputs 88 may include turning on or off (or enabling or disabling) the engine or motor for propelling vehicle 20, locking or unlocking doors, opening or closing windows, sounding or displaying alarms, climate control, enabling or disabling anti-theft systems, and the like.

Figure 3:
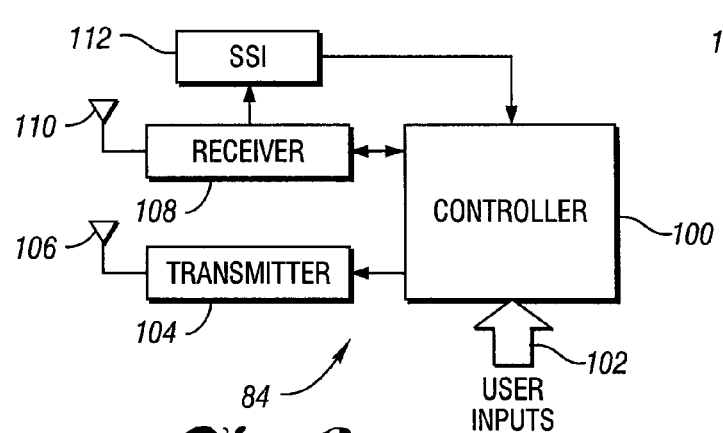
FIG. 3 is a block diagram illustrating a remote control according to an embodiment of the present invention.

Referring now to FIG. 3, a block diagram illustrating a remote control according to an embodiment of the present invention is shown. Keyfob 84 includes controller 100. Controller 100 is preferably a microprocessor but may also include, or be replaced by, application specific integrated circuit(s), discrete logic, analog components, distributed processors, and the like.

Controller 100 receives user inputs 102 provided by a user of keyfob 84. Typically, these include one or more push buttons. However, the present invention does not depend on the type of user inputs 102 provided, which may include various switches, touch pads, balls, sticks, touch screens, and the like. Controller 100 processes the user input to generate command data such as, for example, a remote keyless entry (RKE) command, which is used to modulate a high frequency carrier in high frequency transmitter 104 to produce a modulated signal. This modulated signal is transmitted from high frequency antenna 106. The transmitted signal may also include keyfob identification information, keyfob status information, keyfob location information, and the like. A particular sequence of user activity for user inputs 102 may be used to reactivate keyfob 84, as will be described in greater detail below. Some or all of the transmitted data may be encrypted as is known in the art.

Keyfob 84 also includes low frequency receiver 108 coupled to low frequency antenna 110 and controller 100. Low frequency receiver 108 receives a low frequency signal from antenna 110, demodulates the received signal, and provides the received information to controller 100. Receiver 108 also includes signal strength indication (SSI) circuitry 112 for providing controller 100 with an indication of the strength of a received signal.

Various embodiments of keyfob 84 are possible. Transmitter 104 and receiver 108 may be combined and/or may operate at one frequency, two frequencies or more than two frequencies. Receiver 108 may be part of a transceiver and may operate at a single frequency or separate frequencies for transmission and reception. Transmitter 104 may be a transceiver, or may be augmented with a receiver, for receiving information used by controller 100 such as, by way of an example, for displaying the status of vehicle 20 on keyfob 84. Antennas 106, 110 may be combined into a single antenna. Receiver 108 may be replaced or augmented with a passive RF response such as, for example, with a surface wave acoustic device. In addition, radio frequency transmission may be replaced by, or augmented with, other transmission media including infrared, visible light, sound, and the like.

With reference now to FIGS. 1-3, an embodiment for determining the location of keyfob 84 relative to vehicle 20 that may be used in the present invention is provided. Vehicle module 26 alternately transmits low frequency interrogation signals from interior low frequency antenna 28 and exterior low frequency antenna 32. Keyfob 84 measures the signal strength of each received interrogation signal and transmits a high frequency signal back that includes an indication of the measured signal strength. Vehicle module 26 compares the signal strengths of the interior signal received by keyfob 84 and the exterior signal received by keyfob 84 to determine whether keyfob 84 is located in interior region 22 or exterior region 24 of vehicle 20.

In order to properly distinguish between interior region 22 and exterior region 24, the transmission power of the interrogation signals broadcast from each of antennas 28, 32 must be properly adjusted so that keyfob 84 located in interior 22 always receives a stronger signal from interior antenna 28 than from exterior antenna 32 and so that keyfob 84 located in exterior region 24 always receives a stronger signal from exterior antenna 32. Transmission power is controlled by setting the gain of amplifiers 62, 72 using variables 64, 74, respectively, that drive antennas 28, 32, respectively. Since the radio frequency environment of each particular model of vehicle 20 is different due to variations in antenna location, vehicle dimensions, and the presence of signal attenuating structures such as doors, windows, and vehicle trim panels, the appropriate transmission power is dependent upon the identity of the particular vehicle model. Further discussion on this technique is provided in commonly assigned U.S. Pat. No. 7,046,119, which is hereby incorporated by reference in its entirety. Other techniques for determining the location of keyfob 84 relative to vehicle 20 are known in the art and may be used in the present invention. As will be recognized by one of skill in the art, any technique for determining the location of remote control 84 may be used in the present invention.

For various reasons, it may be necessary to deactivate a remote control in a secure area. For example, when keyfob 84 is within interior 22 of vehicle 24, module 26 disables the passive entry functionality provided by keyfob 84. This prevents unwanted results such as, for example, allowing anyone to open a locked door. The present invention allows for reactivating the remote control when a user enters a code on the remote control.

Figure 4:
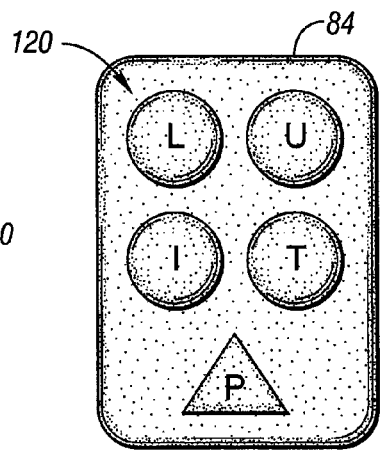
FIG. 4 is a schematic diagram illustrating a keyfob according to an embodiment of the present invention.

Referring now to FIG. 4, a schematic diagram illustrating a keyfob according to an embodiment of the present invention is shown. Keyfob 84 includes a plurality of user activated switches, shown generally by 120. These switches support a variety of RKE functions including lock doors ("L"), unlock doors ("U"), engine ignition ("I"), trunk release ("T"), and panic alarm ("P").

Once deactivated, keyfob 120 may be reactivated by a sequence of activity on switches 120. For example, depressing and holding "L" and "U" keys for a set period of time can initiate the code sequence process. The user then enters a pattern of button pushes (e.g., "I" "P" "U" "U" "L" "I" "T") to reenable passive entry and/or RKE functionality. The proper sequence may be preprogrammed and provided to the vehicle owner (e.g., printed on a card) when the vehicle is purchased. Alternatively, or in addition to preprogramming, the correct code may be programmed at a dealership or by the user.

Figure 5:
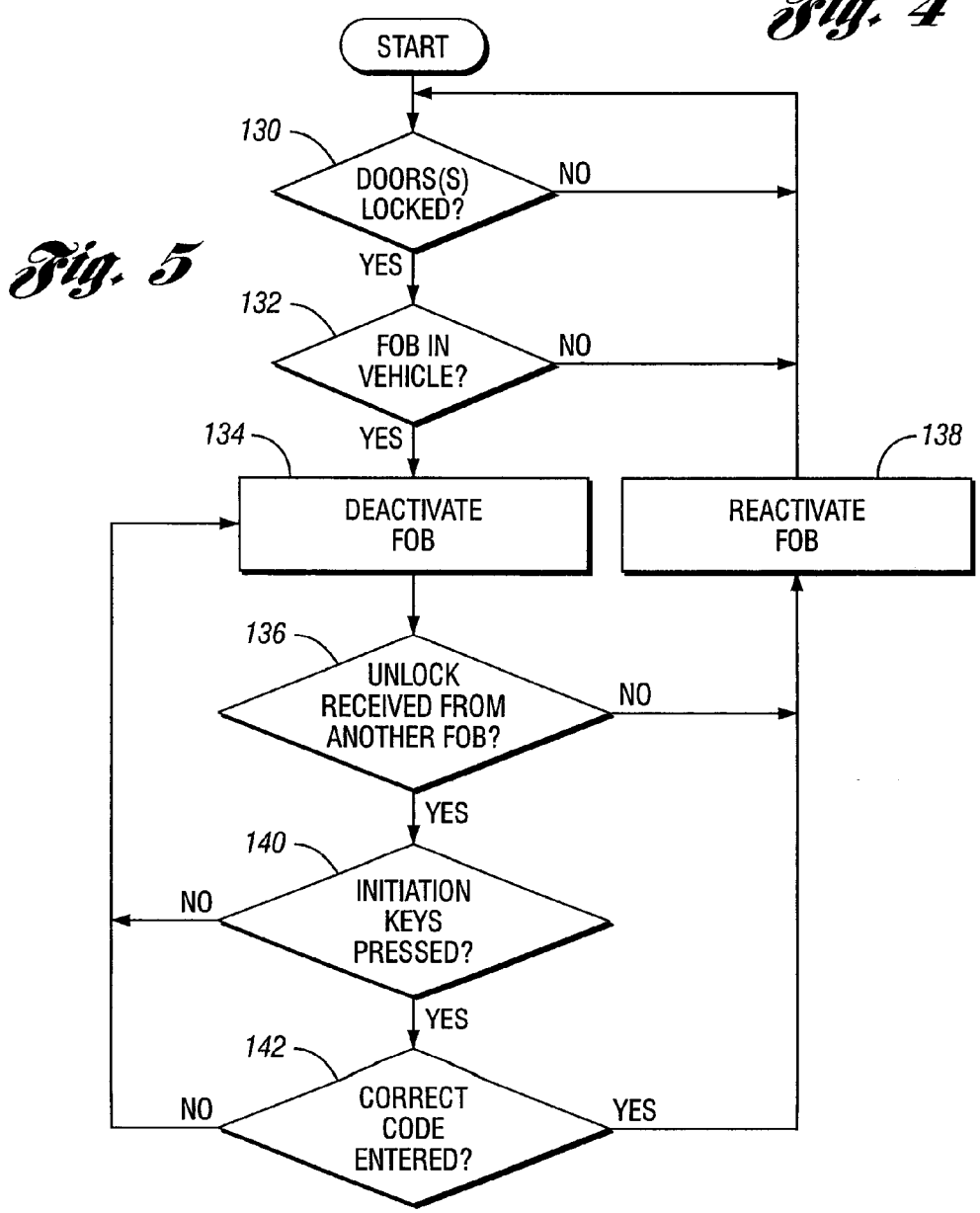
FIG. 5 is a flow diagram illustrating remote control reactivation according to an embodiment of the present invention.

Referring now to FIG. 5, a flow diagram illustrating a method of operating a remote control according to an embodiment of the present invention is shown. As will be appreciated by one of ordinary skill in the art, the operations illustrated are not necessarily sequential operations. The order of steps may be modified within the spirit and scope of the present invention and the order shown here is for logical presentation. Also, methods illustrated may be implemented by any combination of hardware, software, firmware, and the like, at one location or distributed. The present invention transcends any particular implementation and the embodiments are shown in sequential flow chart form merely for ease of illustration.

A check is made to see if one or more doors are locked, as in block 130. If so, a check is made to see if any keyfob is in the vehicle, as in block 132. Some of the various applicable techniques for determining if a keyfob is within the vehicle are described above. If the doors are locked and a keyfob is determined to be within the vehicle, the keyfob is deactivated, as in block 134. Deactivating the keyfob may include ignoring at least a subset of the keyfob functionality. This subset may include some or all of the passive entry functionality and/or some or all of the RKE functionality.

A check is made to determine if an unlock command has been received from an authorized keyfob outside the vehicle in block 136. If so, the one or more deactivated keyfobs within the vehicle is reactivated, as in block 138. Reactivation may include responding to all passive and RKE functionality to the deactivated keyfob. However, limited functionality may be restored in certain applications.

In addition to reactivation following an unlock from another keyfob, or as an alternative to such reactivation, a sequence of user actions on the deactivated keyfob may be used to reactivate that keyfob. In the embodiment provided, a check is made to determine if one or more initiation keys have been pressed, as in block 140. An initiation key may be a special key dedicated to this purpose or a particular activity on one or more user inputs that have other purposes. For example, holding down an RKE function button for an extended period may initiate a reactivation code mode.

A check is made to determine if the correct code is entered, as in block 142. If so, the keyfob is reactivated, as in block 138. A correct code may be, for example, a sequence of RKE function button depressions, a combination of long and short button depressions on a single button, a code entered on a numeric keypad, or the like. The entered code is compared to a stored code to determine if it is correct. The stored code may be permanently held in the keyfob or in the vehicle module responding to the keyfob. The stored code may also be entered at a dealership or by the user.

While embodiments of the invention have been illustrated and described, it is not intended that these embodiments illustrate and describe all possible forms of the invention. For example, the preferred embodiment discloses a passive entry system for a vehicle. However, the present invention may find application in a wide variety of applications, including building security, garage door openers, gate controls, appliance activation, and the like. Therefore, the words used in the specification are words of description rather than limitation, and it is understood that various changes may be made without departing from the spirit and scope of the invention.

What is claimed is:

1. A remote control system for gaining access to a vehicle, the remote control system comprising:
a portable control unit including a user interface accepting user input, the portable control unit operable for transmitting passive entry function commands and remote keyless entry function commands for controlling passive entry functions and remote keyless entry functions, the portable control unit operative to respond to a radio frequency query;
a radio frequency transmitter separate from the portable control unit, the transmitter having at least one antenna for determining if the portable control unit is within the vehicle by transmitting the radio frequency query; and
control logic separate from the portable control unit, the control logic in communication with the transmitter, the control logic operative to determine if the vehicle is locked, the control logic further operative to ignore both passive entry function commands and remote keyless entry function commands transmitted by the portable control unit after the vehicle has been locked with the portable control unit within the vehicle until a predetermined code is entered on the user interface of the portable control unit, the control logic further operative to accept both passive entry function commands and remote keyless entry function commands transmitted by the portable control unit upon the predetermined code being entered on the user interface of the portable control unit after the control logic was operative to ignore both passive entry function commands and remote keyless entry function commands transmitted by the portable control unit.

2. The remote control system of claim 1 wherein at least one of the functions comprises controlling at least one door operation.

3. The remote control system of claim 1 wherein at least one of the functions comprises starting at least one of an engine and a motor in the vehicle.

4. The remote control system of claim 1 wherein the radio frequency query is transmitted at a first frequency and the portable control unit commands are transmitted at a second frequency different than the first frequency to a receiver in communication with the control logic.

5. A method of controlling access to functionality in a vehicle, the method comprising:
- determining whether or not a portable remote control unit capable of transmitting passive entry function commands and remote keyless entry function commands is within the vehicle;
- determining whether the vehicle is locked;
- determining whether the portable remote control unit is within the vehicle after the vehicle has been locked;
- deactivating both of passive entry function commands and remote keyless entry function commands from the portable remote control unit if the portable remote control unit is determined to be within the vehicle after the vehicle has been locked;
- receiving a sequence of user inputs from the portable remote control unit; and
- reactivating both of passive entry function commands and remote keyless entry function commands from the portable remote control unit if the received sequence of user inputs matches a predetermined sequence of expected user inputs.

6. The method of controlling access to functionality in a vehicle as in claim 5 wherein at least one of the function commands comprises a command to unlock at least one vehicle door.

7. The method of controlling access to functionality in a vehicle as in claim 5 wherein at least one of the function commands comprises a command to enable a motive driver for the vehicle.

8. The method of controlling access to functionality in a vehicle as in claim 5 wherein determining whether or not the portable remote control unit is within the vehicle comprises transmitting a radio frequency signal from at least one antenna associated with the vehicle.

9. The method of controlling access to functionality in a vehicle as in claim 8 wherein the frequency of the signal transmitted to determine whether or not the portable remote control unit is within the vehicle is different than the frequency of a signal transmitted by the portable remote control unit for either of a passive entry function command or a remote keyless entry function command.

10. A system for a vehicle, the system comprising:
- a portable unit with a user input, the portable unit responding to transmissions from the vehicle to determine a location of the portable unit and to transmit passive entry commands to the vehicle for controlling passive entry functions, the portable unit responding to the user input to transmit remote keyless entry commands to the vehicle for controlling remote keyless entry functions;
- a locating system on the vehicle determining the location of the portable unit; and
- control logic within the vehicle operative to determine if the vehicle is locked, the control logic further operative to disable response to both of the transmitted passive entry function commands and the transmitted remote keyless entry function commands after the vehicle has been locked with the portable unit within the vehicle and to reenable response to the disabled command response when a proper sequence is entered on the portable unit user input.

11. The system of claim 10 wherein the passive entry functions include a push button start vehicle function.

12. The system of claim 10 wherein the locating system comprises at least one interior antenna and at least one exterior antenna.

* * * * *